(12) United States Patent
Crinon (10) Patent No.: US 8,385,425 B2
(45) Date of Patent: Feb. 26, 2013

(54) TEMPORAL VIDEO FILTERING FOR REAL TIME COMMUNICATION SYSTEMS

(75) Inventor: Regis J. Crinon, Camas, WA (US)

(73) Assignee: Microsoft Corporation, Redmond, WA (US)

(*) Notice: Subject to any disclaimer, the term of this patent is extended or adjusted under 35 U.S.C. 154(b) by 1219 days.

(21) Appl. No.: 11/924,286

(22) Filed: Oct. 25, 2007

(65) Prior Publication Data

US 2009/0110078 A1    Apr. 30, 2009

(51) Int. Cl.
H04N 7/12     (2006.01)
H04N 11/02    (2006.01)
H04N 11/04    (2006.01)

(52) U.S. Cl. ................................. 375/240.24
(58) Field of Classification Search ............. 375/240.24
See application file for complete search history.

(56) References Cited

U.S. PATENT DOCUMENTS

| | | | |
|---|---|---|---|
| 5,903,680 A | 5/1999 | De Haan et al. | |
| 5,959,693 A | 9/1999 | Wu et al. | |
| 6,005,626 A | 12/1999 | Ding | |
| 6,281,942 B1 | 8/2001 | Wang | |
| 6,611,530 B1 | 8/2003 | Apostolopoulos | |
| 6,990,252 B2 | 1/2006 | Shekter | |
| 7,199,838 B2 | 4/2007 | Lin et al. | |
| 7,224,852 B2 | 5/2007 | Lipton et al. | |
| 2006/0044475 A1* | 3/2006 | Lin et al. | 348/700 |
| 2007/0069980 A1 | 3/2007 | MacInnis | |
| 2007/0071343 A1 | 3/2007 | Zipnick et al. | |
| 2007/0139517 A1* | 6/2007 | Jenkins | 348/14.09 |
| 2007/0263126 A1* | 11/2007 | Chao et al. | 348/607 |
| 2008/0055325 A1* | 3/2008 | Seigneret et al. | 345/538 |

OTHER PUBLICATIONS

Bennett, E. et al., "Video Enhancement Using Per-Pixel Virtual Exposures," *SIGGRAPH 2005 Papers*, http://delivery.acm.org/10.1145/1080000/1073272/p845-bennett.pdf?key1=1073272&key2=4143967811&coll=GUIDE&dl=GUIDE&CFID=32397927&CFTOKEN=93842356, pp. 845-852 (Jul. 2005).

Gangal, A. et al., "Improvement of Video Signal-to-Noise Ratio with Adaptive Recursive Filtering," *8th Mediterranean Electrochemical Conference*, http://ieeexplore.ieee.org/iel3/3992/11485/00551279.pdf?tp=&arnumber=551279&isnumber=11485, pp. 1686-1689 (May 13-16, 1996).

Shih, T. et al., "Motion Picture Inpainting on Aged Films," *Proceedings of the 13th Annual ACM International Conference on Multimedia*, http://delivery.acm.org/10.1145/1110000/1101215/p319-shih.pdf?key1=1101215&key2=3967967811&coll=GUIDE&dl=GUIDE&CFID=32397927&CFTOKEN=93842356, pp. 319-322 (Nov. 2005).

\* cited by examiner

*Primary Examiner* — Huy D Vu
*Assistant Examiner* — Adnan Baig
(74) *Attorney, Agent, or Firm* — Merchant & Gould (57) ABSTRACT

Background vs. foreground decisions for video frames to be compressed and transmitted in a real time video communication system are made based on a non-parametric approach using signs of pixel value changes in sequential frames. Pixel value changes are tracked as negative or positive. Cost functions may be assigned to rows and columns of predefined blocks and a decision made based on randomness of the signs within the block whether the block represents background (noise) or foreground. Recursive temporal filtering is then employed to reduce the background noise progressively resulting in increased compression and transmission efficiency. Offset tiling is used to increase accuracy of randomness determination when blocks include background and foreground combinations.

20 Claims, 8 Drawing Sheets

TEMPORAL VIDEO FILTERING FOR REAL TIME COMMUNICATION SYSTEMS

BACKGROUND

The invention addresses the problem of removing random noise ("static") in the video signals produced by webcams. In real time communication systems video communication over a private or a public IP network is done by capturing video and audio through a capturing device such as a webcam at each end-point (e.g. participants in a peer-to-peer call or participants in a multi-party conference). The electronics in a camera inherently add noise to the video frames. As a result, the video may not look clean and the video compression engine responsible for compressing the video before it is transmitted over the IP network may end up spending bits inefficiently on encoding noise.

Traditional temporal video filtering approaches are based on parametric/threshold-based techniques where the power of the noise needs to be known. These techniques typically compute standard deviation or local variation between pixels (e.g. in one color channel) in sequential frames attempting to detect "changes" in content within a predefined block. If the change (based on the set threshold) is there, the block is not filtered, because it belongs to a moving foreground.

The challenge with the above described approaches is that they are parametric, i.e. they rely on predefined thresholds. Thus, it becomes difficult to deal with different levels of inherently generated noise.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a non-parametric approach for filtering noise in real time video communication systems. Instead of using parametric values for computing pixel changes such as standard deviation or variation, signs of differences between sequential frame blocks are employed in determining whether a block represents noise (i.e. background) or moving foreground. Further embodiments include use of cost functions on rows and columns of difference signs, use of tiling of blocks on a frame for enhanced accuracy, recursive temporal filtering of noise, and the like.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, signs of differences between pixel values located at the same relative location within a frame but in sequential frames may be used to determine whether a block represents noise (background) or moving foreground and the block filtered according to that determination. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
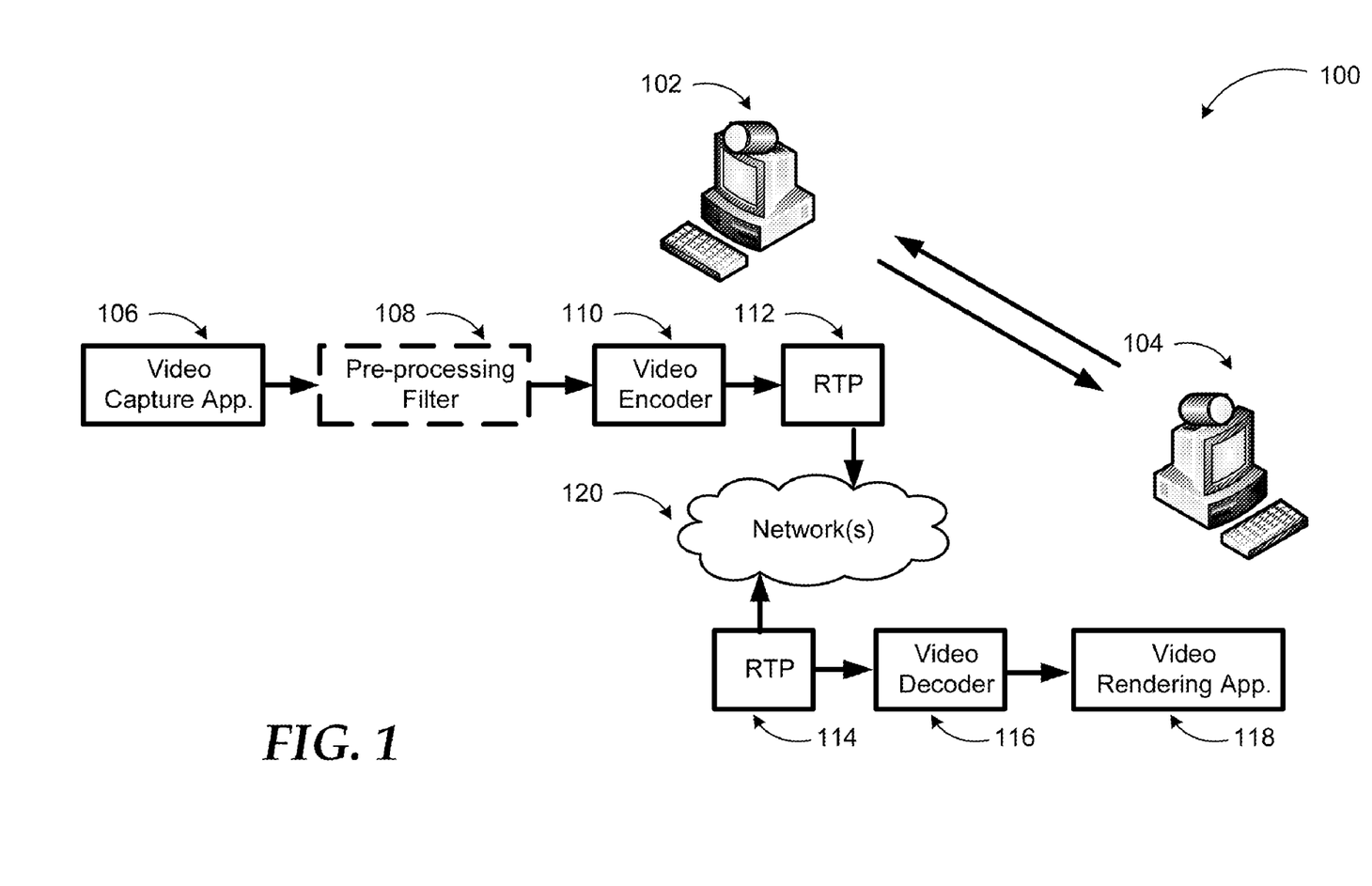
FIG. 1 illustrates main components in an example real time video communication system.

Referring to FIG. 1, main components in an example real time video communication system 100 are illustrated. With the proliferation of Internet-based communication tools and applications, video applications that provide video communication over private or public networks have grown in number and variety. Such applications may be local applications residing on client devices (e.g. 102, 104) or hosted applications executed by a service and used by a client device/application remotely. In any case, video images are captured by a camera device such as a webcam.

In FIG. 1, computing device 102 represents a source for the video signals, which may be a computer with a webcam capable of facilitating video communications. Other implementations may include video capture devices with their own processing and communication capability, servers managing video capture devices and or client devices with video capability, and the like. A typical video communication begins at device computing 102 with a video capture application 106, which captures frames of video through the camera. The video signal may first be passed through a pre-processing filter 108 for a number of processing operations known in the art. The pre-processing filter is an optional component and may not be included in some embodiments. On the other hand, the non-parametric temporal video filtering according to embodiments may be implemented in a pre-processing filter block too. According to further embodiments, the sign based noise detection and filtering may also be implemented in video encoder 110.

The processed video signal is encoded in video encoder 110 for transmission over a network and provided to Real Time Protocol (RTP) block 112 for formatting the signal to be transported over the network. Any one of a number of network transportation protocols may be employed to transmit the signal to a receiving device (e.g. computing device 104). Network(s) 120 may include private or public networks such as the Internet, or a combination of the two. The signal is received by another RTP block 114 at the receiving device and translated. Video decoder 116 decodes the signal and provides the decoded signal to rendering application 118, which renders it on a display. In a practical implementation, the communication is bidirectional and both devices (102 and 104) are capable of capturing and rendering video for real time video communication. However, embodiments are not so limited. Unidirectional real time communications such as a video seminar that is disseminated to multiple receivers may also employ a non-parametric sign based noise determination technique according to embodiments.

As briefly mentioned above, video capturing devices inherently generate noise, which—if not treated—may result in inefficient use of encoding and transmission resources. Complex algorithms for detecting and reducing noise based on noise power levels may be costly in terms of system resources such as memory, processing power, etc. A real time video communication system according to embodiments performs noise detection merely based on signs of corresponding pixel levels between sequential frames substantially reducing computational complexity. The approach combined with a recursive temporal video filtering enables background noise (non-moving areas of video capture area) to be reduced significantly, thereby increasing encoding and transmission efficiency (i.e. fewer bits/smaller bandwidth is needed to transmit the same video signal compared to a non-filtered version).

The sign based noise detection and temporal filtering described in more detail below may be implemented in any type of video capture and communication system using any one of the color or grey scale modes. For example, an algorithm according to embodiments may be implemented for each channel of and RGB (or YUV) system or in a black and white system. Noise detection decisions for each block may be made separately for each channel and a combination of the decision employing an OR, an AND, or a WORST CASE operator may be produced reaching a decision for a block.

Figure 2:
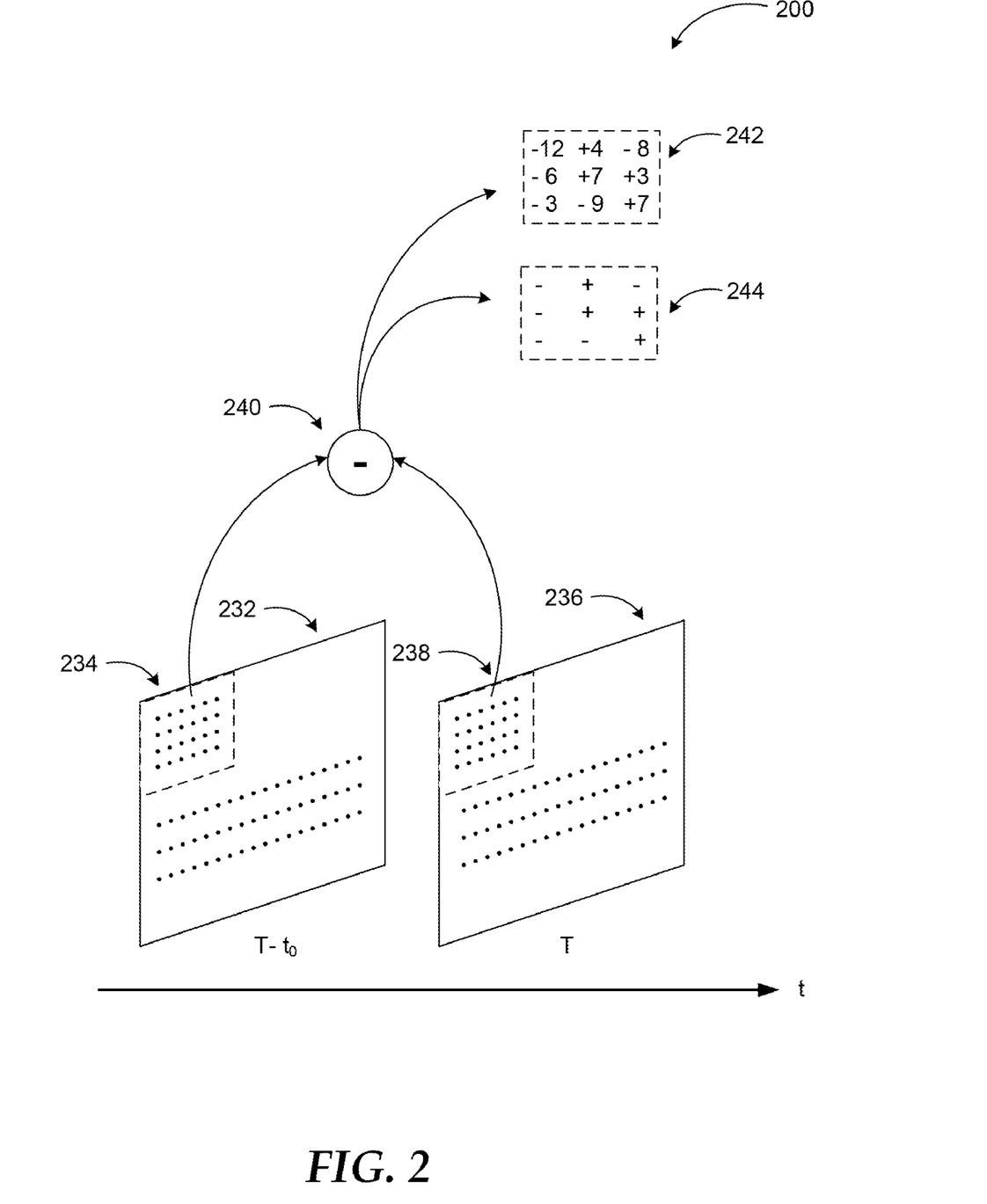
FIG. 2 illustrates conceptually the computation of pixel level changes between two sequential frames using differences and signs of differences.

FIG. 2 illustrates conceptually the computation of pixel level changes between two sequential frames using differences and signs of differences. Two sequential video frames 232 and 236 at time points $T-t_0$ and $T$ are illustrated on time line. Each of the frames includes a number of pixels based on a resolution of the video capture application (device). In typical video frame processing, the frames are processed in non-overlapping and corresponding blocks (e.g. blocks 234 and 238). Traditional systems average (240) two sequential frames block by block. While this technique may be sufficient and resource efficient when an object in the video frame is not moving, it results in unacceptable ghost trailing effects when the object moves. Thus, averaging may be employed for background sections of the frame where there is no movement, just noise. The block size may be selected based on a resolution of the system (e.g. 256 pixels in an 8-bit system).

To determine which blocks can be averaged and which ones cannot, a classification of the blocks is performed. Traditional temporal filtering typically undertakes this process by determining differences (242) between pixel values of the two sequential frames 232, 236 and computing means and/or variances of the differences within the block. The variance corresponds to a power of the noise in the video signal. The variance may then be compared to a predetermined threshold and the decision made whether the block is foreground or background. In addition to being computation-intensive, this approach has the challenge of being dependent on a suitable threshold. As mentioned previously, noise is generated inherently by the video capture devices and each device may generate different levels of noise based on its electronic characteristics, lighting conditions, etc. A dynamic threshold that can compensate for device characteristics may also be computed, but would require even more system resources such as memory, processing power, etc.

A real time video system according to embodiments does not require computation of difference values, means, or variances. Instead, the system simply tracks the change in pixel levels of sequential frames (or blocks) by recording the differences as signs (244). For example, if a pixel level increases from the previous frame to the current frame, it is noted as a positive sign (+). Accordingly, a decrease in the pixel level between the two sequential frames is noted as a negative sign (−). Once a block of signs are determined, a classification of the block can be made based on a distribution of the signs within the block. If the distribution of the signs indicates a random distribution of changes, the block is most likely background or non-moving foreground (random noise). If the sign distribution indicates a structure, the block corresponds to moving foreground (structured noise). The moving foreground blocks may be treated differently from the background/non-moving foreground blocks, which may be averaged or recursively filtered to reduce a number of bits necessary to encode the complete frame, thereby also reducing a bandwidth necessary to transmit the video frame over a network.

The randomness of the signs may be determined employing a number of methods. The sign block may be compared to an ideal noise template, consecutive signs in each row and/or column may be simply counted, a cost function may be assigned (described below) to the count of consecutive signs in each row or column, etc. Ultimately, the noise classification may be accomplished without having to compute difference values, means, or variances, and without having to deal with thresholds to compare the variances to. As a consequence the algorithm may be used in a generic fashion and in particular, does not need to be tuned or adjusted to the specifics of a webcam.

Figure 3A:
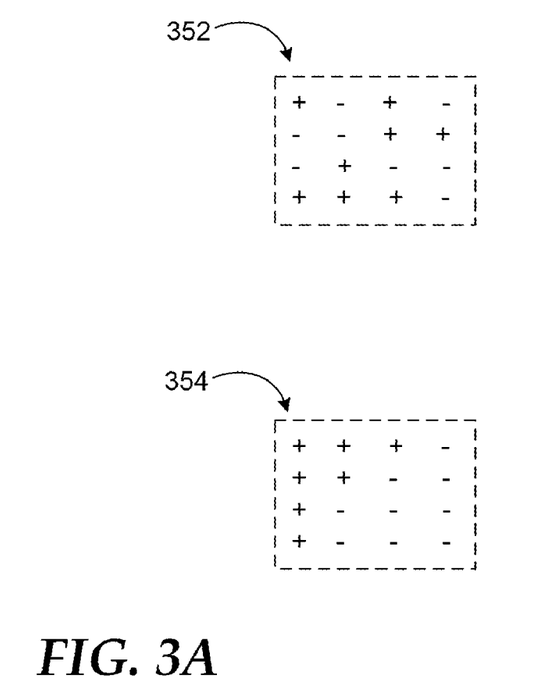
FIG. 3A illustrates an example block that includes randomly distributed signs of differences (noise) and another example block that includes non-randomly distributed signs of differences (structured noise or moving foreground)

FIG. 3A illustrates an example block that includes randomly distributed signs of differences (noise) and another example block that includes non-randomly distributed signs of differences (structured noise or moving foreground).

The basic principle of noise classification based on signs of pixel changes is how the signs are structured. The example block 352 of FIG. 3A shows a block with unstructured or random noise. The random distribution of signs indicates that some pixel values increased between the two sequential frames while others decreased. This indicates that the block contains mainly background or non-moving foreground information and not a structured, moving foreground. As mentioned above, the classification may be performed by simply counting a number of signs in each row and/or column. Block 354 illustrates the signs of another set of two sequential frames, where the signs are structured (confined to a contiguous set of locations in the block) meaning the block contains moving foreground information.

Figure 3B:
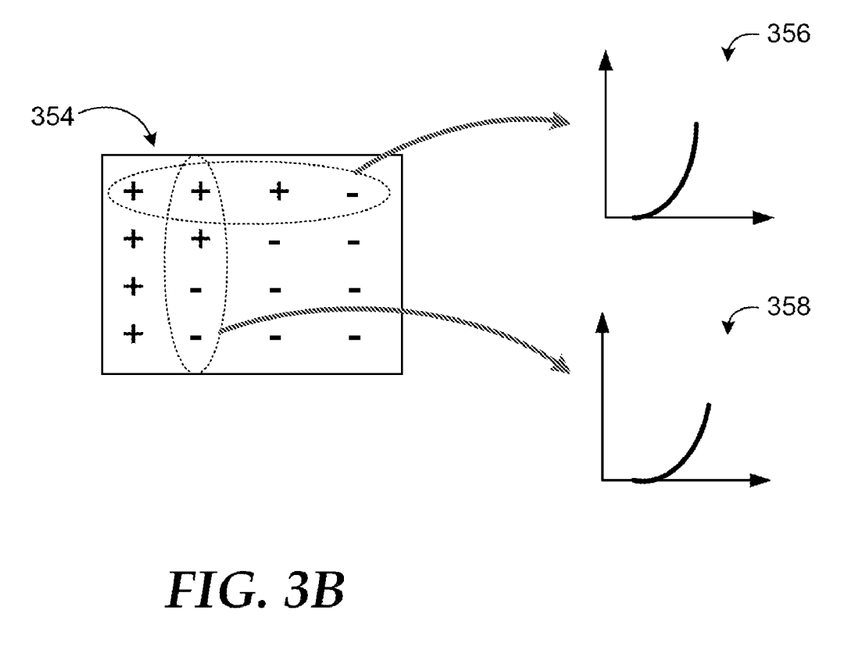
FIG. 3B illustrates example computation of cost functions for rows and columns of a block of signs of differences to determine whether the block represents random noise.

FIG. 3B illustrates example computation of cost functions for rows and columns of a block of signs of differences to determine whether the block represents random noise. The accuracy of simple sign counting may not be sufficient in some cases. For increased accuracy, cost functions (e.g. cost function 365, 358) may be assigned to each row and/or column of signs in example block 354. The cost function may be selected as complex as a user wishes. In most cases a simple counting of consecutive signs in a row or column and assigning a weight to the count may suffice. In other cases (and if more processing power and memory are available), more complex cost functions may also be used. However, the cost function should be designed to capture a growing confidence in structure in the differences when it happens. The longer the run of contiguous + signs or the longer the run of contiguous − signs, the larger the confidence that the differences are not noise induced but motion induced. The increased confidence can be captured in the form of a non-linear cost function as shown in 356 and 358. The cost function keeps increases as long as the contiguous run of + or − signs continues. The results are accumulated from one pixel location to another until the sign changes or a difference of 0 is encountered. In such case, the cost function is re-initialized for another run of +'s and −'s. The cost function is often re-initialized when the differences are random because they are induced by noise. In this case, the accumulated scores produced by the cost function remain low.

The cost function for each row and column may then be compared to a predefined threshold and the classification made based on the comparison. In yet another embodiment, the block of signs may be compared to a template of ideal noise (random distribution of signs) and the classification made based on how far apart the block and the ideal noise template are.

Figure 4:
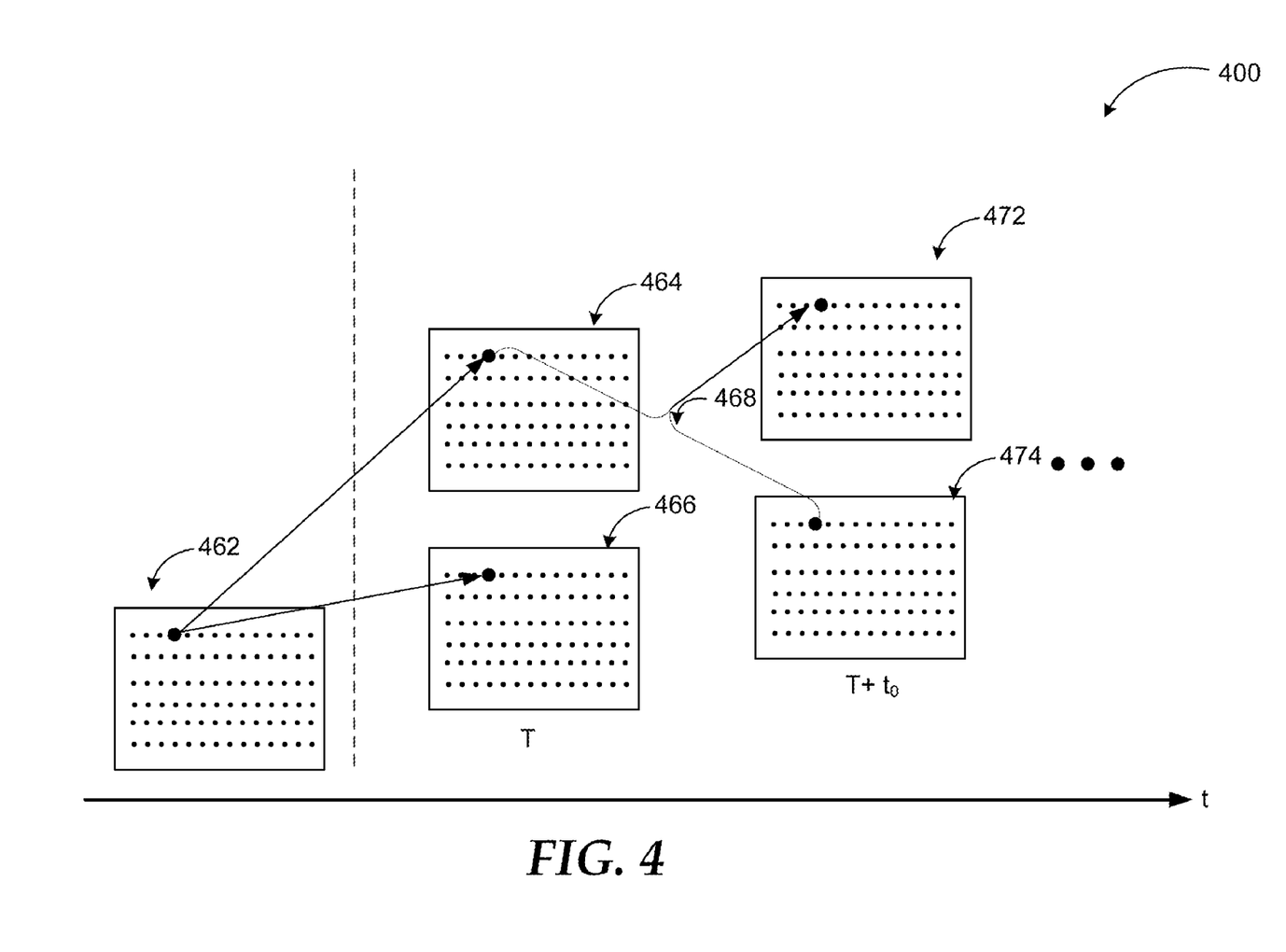
FIG. 4 shows progression of frame processing in recursive temporal video filtering according to embodiments.

FIG. 4 shows progression of frame processing in recursive temporal video filtering according to embodiments. Once the blocks of a frame are classified, the noise (background) within the frame may be reduced recursively employing temporal filtering.

Starting with the initial frame 462, first sign based noise classification is performed and first reference (noise filtered) frame 464 generated from frame 466 at t=T. Frame 464 results from applying a temporal filter (averaging) for the pixels that have been identified as part of background or non-moving foreground (low score produced by the cost function). Then, the subsequent frame 474 is classified block by block at t=T+$t_0$. This is done by calculating the sign of pixel value differences across frame 466 and 474. Corresponding background blocks (or pixels) of the sequential frames are averaged (468) and written to the rendered frame 472, which is also used as the new reference (filtered) frame for the recursive temporal filter. This recursive classification and averaging of the background blocks process is continued as new frames are captured resulting in the noise being continuously reduced. The weight of the pixel value in the averaging operation decreases in time so the contents of the temporally filtered frames 464, 472, . . . converge to a stable set of pixel values in the area that has been identified as background or non-moving foreground. It should be noted, that the averaging operation is only done for those pixels belonging to blocks that have been tagged as "background" or "non-moving foreground". In particular, averaging is stopped and the contents of filtered frames such as 472 are replenished with the content of corresponding input frame (i.e. 474) at pixels which belong to blocks tagged as "moving foreground". The recursive noise filtering methodology depicted in FIG. 4 leads to a continuous "cleaning" of the noise for blocks that remain tagged as "background" or "non-moving foreground". This in turn results in an increase of encoding efficiency by reducing a number of necessary bits assigned to blocks classified as noise. The increase in encoding efficiency means better compression for the video signal and reduced bandwidth requirement for the same resolution and quality of video.

Of course, the filtering and classification methods described above are not limited to the example listed methods. Other recursive filtering approaches and randomness determination methods may be employed based on the signs of pixel changes using the principles described herein. For example, the temporal filtering may be implemented as a background or non-moving foreground pixels averaging operation across the last N frames, with the assumption that the last N frames have been saved in memory. Furthermore, a system implementing sign based noise classification may be designed with more or fewer components than those described above, especially in conjunction with FIG. 1 without departing from the scope and spirit of the present disclosure.

Figure 5:
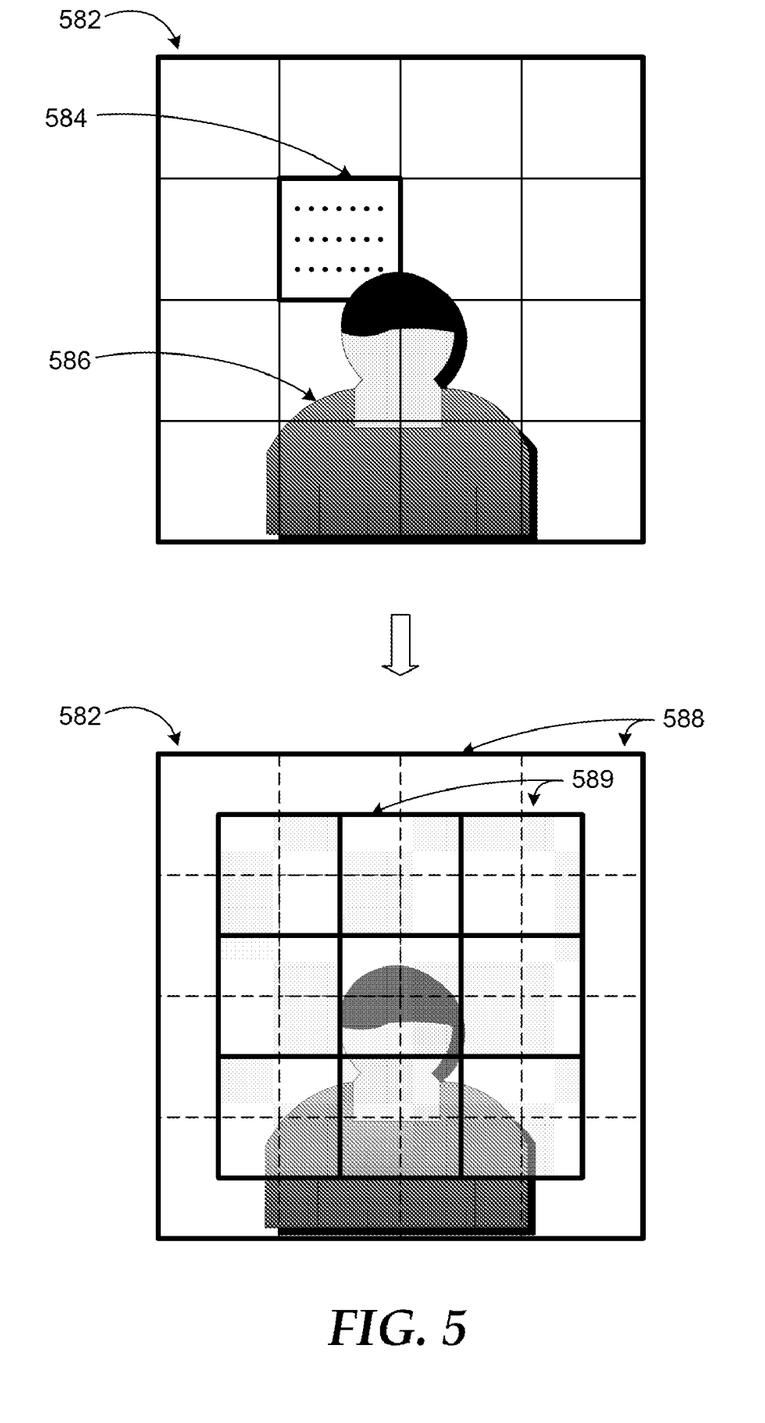
FIG. 5 is a diagram illustrating use of offset tiling in determining whether blocks in a frame represent background or foreground.

FIG. 5 is a diagram illustrating use of offset tiling in determining whether blocks in a frame represent background or foreground. As described above, whether a predefined region of a video frame represents background areas is determined based on signs of pixel level changes in each region between subsequent frames. The regions or blocks may be determined based on a number of factors. If the blocks are selected too small, the degree of randomness may not be captured as accurately and result in lower resolution. On the other hand, large blocks (or even medium sized blocks) may include a combination of pixels belonging to background and moving foreground. If the background area takes a majority of the block's area, the moving foreground portion in that block may be lost as a result of the sign based detection and filtering process.

Offset tiling may be employed to use a large enough block size while preventing loss of power to differentiate background from foreground in some of the blocks. During a first pass of sign based noise classification, the blocks according to a default tiling (the rectangular frame divided by the predefined number of blocks) may be used and difference sign based calculations executed on each block as illustrated by example block 584 and the remaining blocks of frame 582. As shown in the first frame, some of the blocks like block 584 also include a small portion of moving foreground (e.g. a portion of the person in the frame).

In a second pass of the algorithm, a different tiling, such as an offset tiling as illustrated by the darkened blocks 589 may be employed. The offset blocks 589 overlap partially with the initial blocks 588 of the default tiling. According to a preferred embodiment both vertical and horizontal offsets are set to half the size of the vertical and horizontal block size, respectively. While small portion(s) of the moving foreground may be in some of the initial blocks, the offset blocks include larger portions of the moving foreground and are thus more likely to be decided as foreground blocks. When the results of the default and offset tiling are combined, decisions may be made at the pixel or block level and the randomness captured accurately. More specifically, only pixels that have been found twice to belonging to "background" or "non-moving foreground" may be labeled as such. Other pixels (those that have been found to belong to moving foreground) are not temporally filtered.

The offset of the blocks may be selected such that there is a predefined amount of overlap (¼ block, ½ block, etc.). The scores may be tracked at pixel or block level (or overlapping region level) resulting in increased resolution. It should be noted, that this dual pass method results in labeling blocks as background or foreground, and these blocks are a quarter of the size of the original blocks (assuming the preferred embodiment conditions mentioned above).

Figure 6:
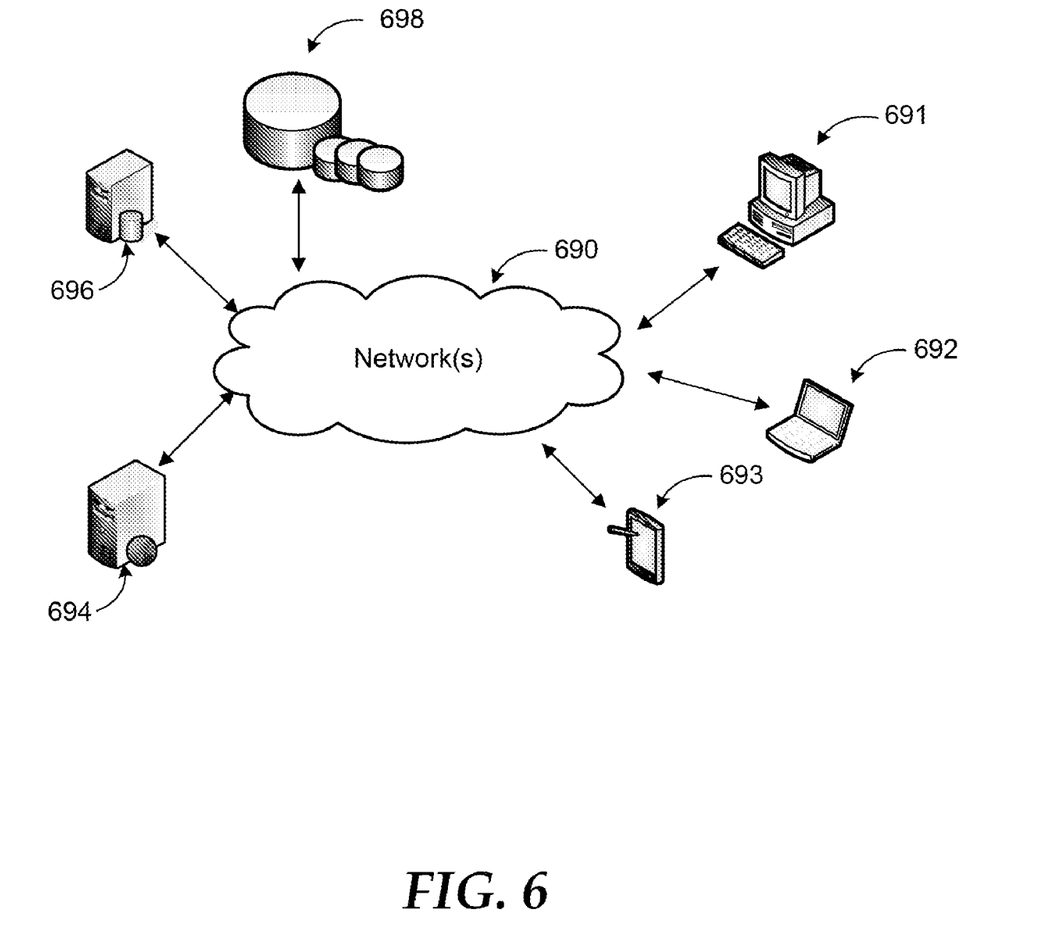
FIG. 6 illustrates a networked environment where embodiments may be implemented.

FIG. 6 is an example networked environment, where embodiments may be implemented. A video capture application employing temporal noise filtering based on signs of pixel values in sequential frames according to embodiments may be implemented locally or in a distributed manner over a number of physical and virtual clients and servers. It may also be implemented in un-clustered systems or clustered systems employing a number of nodes communicating over one or more networks (e.g. network(s) 690).

Such a system may comprise any topology of servers, clients, Internet service providers, and communication media. Also, the system may have a static or dynamic topology. The term "client" may refer to a client application or a client device. While a networked system implementing sign based noise filtering in real time video communications may involve many more components, relevant ones are discussed in conjunction with this figure.

Video capture applications may be executed and video rendered in individual client devices 691-693. Temporal video filtering according to embodiments may be implemented in each of the individual applications or in a single distributed application that manages video communications for all participating client devices. If the video application is part of a communication application (or service), the application or service may be managed by one or more servers (e.g. server 694). A portion or all of the generated video may be stored instead of being instantaneously rendered. In that scenario, the video files may be stored in a data store such as data stores 698 and provided to the video rendering application(s) in individual client devices subsequently through database server 696 or retrieved directly by the video rendering application(s).

Network(s) 690 may include a secure network such as an enterprise network, an unsecure network such as a wireless open network, or the Internet. Network(s) 690 provide communication between the nodes described herein. By way of example, and not limitation, network(s) 690 may include wired media such as a wired network or direct-wired connection, and wireless media such as acoustic, RF, infrared and other wireless media.

Many other configurations of computing devices, applications, data sources, data distribution systems may be employed to implement a real time video communication system with non-parametric sign based noise detection and filtering. Furthermore, the networked environments discussed in FIG. 6 are for illustration purposes only. Embodiments are not limited to the example applications, modules, or processes.

Figure 7:
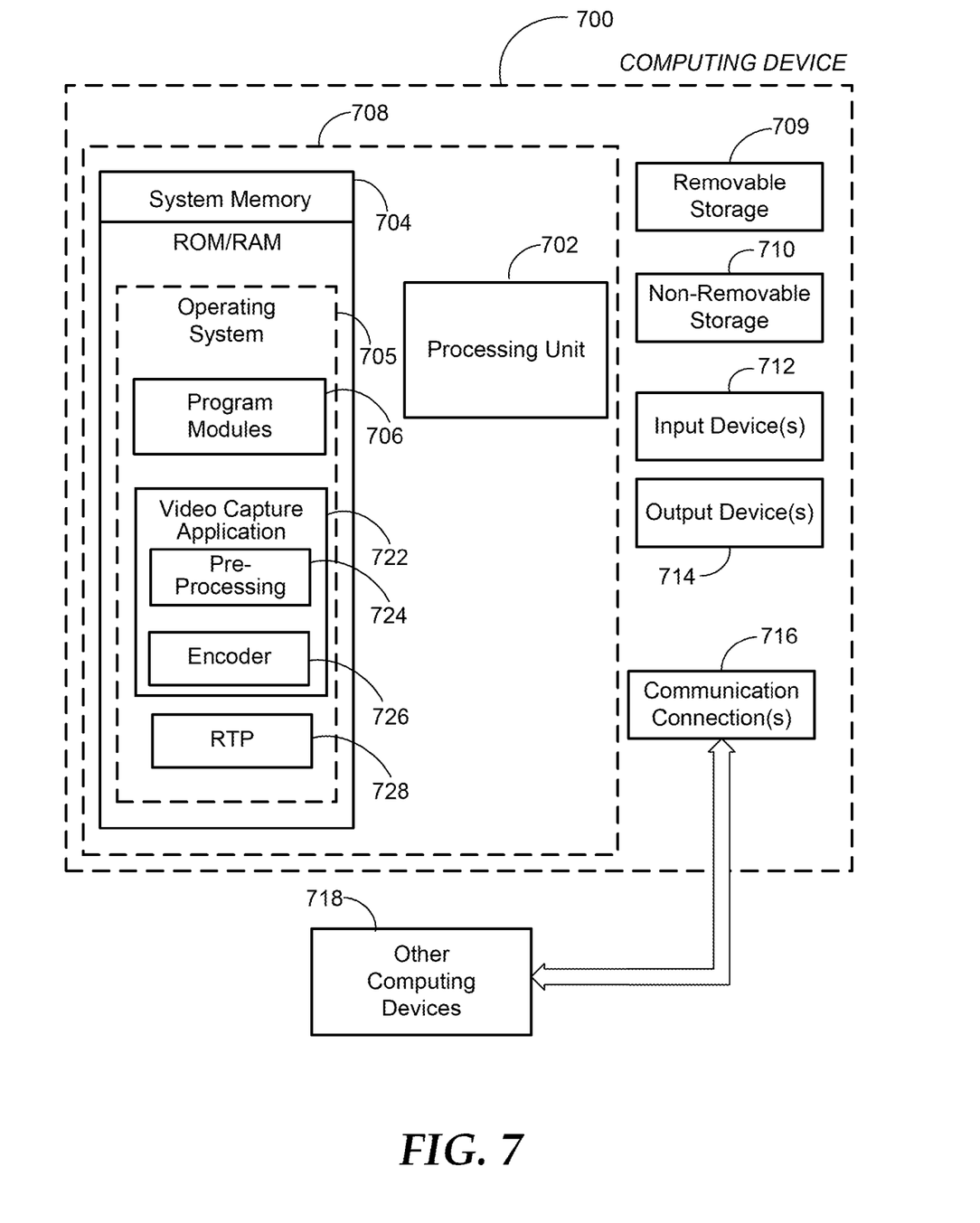
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be a client device executing an audio application and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the computing device, such as the WINDOWS® operating systems from MICROSOFT CORPORATION of Redmond, Wash. The system memory 704 may also include one or more software applications such as program modules 706, video capture application 722, pre-processing module 724, encoder module 726, and RTP module 728.

Video capture application 722 may be a separate application or an integral module of a hosted service application that provides video capture based on received video signals from a camera associated with computing device 700. Pre-processing module 724 provides non-parametric sign based noise detection and temporal video filtering services for improving video compression and transmission efficiency, as described previously. Encoder module 726 encodes the video signal providing video compression and provides the signal to RTP module 728, which processes the signal for transmission over a network according to a predefined transportation protocol. RTP module 728 may be part of communication connections block 716. This basic configuration is illustrated in FIG. 7 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include client devices or server(s) that execute applications associated with rendering video signals from video capture application 722 in computing device 700. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. While the presence of a modulated data signal may be transitory in nature, the signal is generated to cause changes in a receiving device, thereby creating physical and tangible changes (effects) during its reception by the receiving device. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
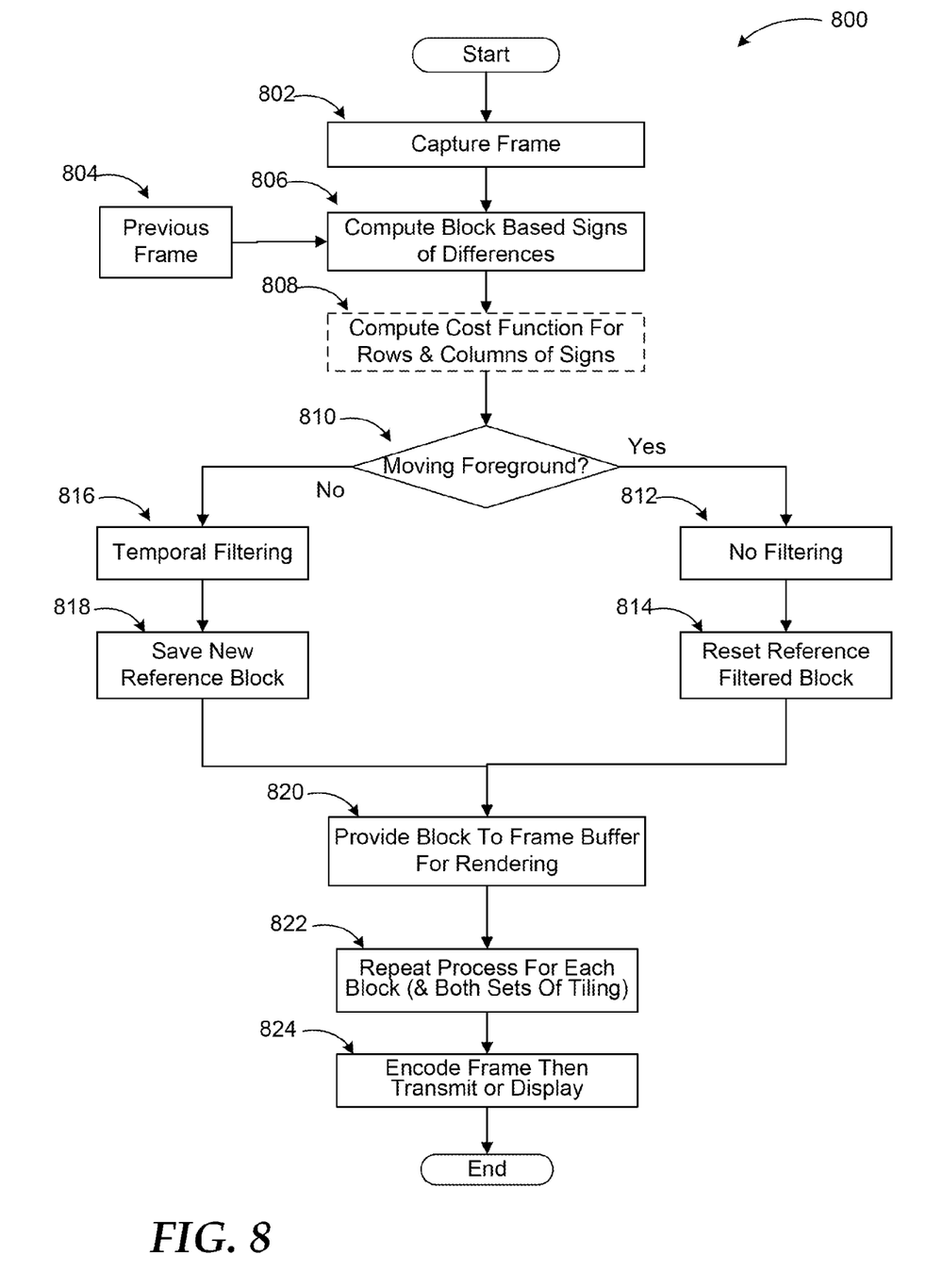
FIG. 8 illustrates a logic flow diagram for a process of non-parametric temporal video filtering according to embodiments.

FIG. 8 illustrates a logic flow diagram for a process of non-parametric temporal video filtering according to embodiments. Process 800 may be implemented, for example, as part of the video capture application 106 of FIG. 1.

Process 800 begins with operation 802, where a frame of video is captured. Prior to capturing the frame in operation 802 a previous frame may be captured and stored. This previous frame may be provided at operation 804 along with the captured frame of operation 802 to the video application for computation of block based signs of differences at operation 806. The signs are determined based on changes of pixel values between the sequential frames. Processing advances from operation 806 to operation 808.

At operation 808, a score resulting from applying a predefined cost function may be computed optionally for rows and columns of signs determined at operation 806. As discussed previously, a block may be classified as background/non-moving foreground or moving foreground based on randomness of the signs within that block. While the classification may be made simply based on a count or distributions of the signs, in a more accurate system, the cost functions may be employed to make the determination. The cost functions may be selected based on user preferences, processing power, available memory, bandwidth, etc. Processing moves from operation 808 to decision operation 810.

At decision operation 810, a determination is made whether the block is moving foreground. If the block is classified as moving foreground, no filtering is performed (operation 812) and the reference filtered block for recursive temporal filtering is reset at operation 814. Processing then proceeds to operation 820.

If the block is classified as background based on the randomness of the signs, recursive temporal filtering is performed at next operation 816 as described in conjunction with FIG. 4. The new block is then saved as the reference block for further recursive filtering at operation 818. Processing advances from operations 818 and 814 to operation 820.

At operation 820, the block is provided to frame buffer for rendering or encoding prior to transmission. At operation 822 following operation 820, the process described above is repeated for each block of the frame. If offset tiling is implemented, the process is also repeated for each one of the offset blocks as well before blocks are classified. Processing moves from operation 822 to operation 824. At operation 824, the frame is encoded and transmitted or displayed once all the blocks are classified. After operation 824, processing moves to a calling process for further actions.

The operations included in process 800 are for illustration purposes. Sign based noise classification for temporal video filtering may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for temporal filtering of video signals employing sign-based pixel difference classification, the method comprising:
   receiving two sequential video frames comprising a current frame and an immediately previous frame;
   comparing pixel values of a block of pixels in the current frame with pixel values of a corresponding block of pixels in the immediately previous frame;
   from the comparison, identifying differences in values between the pixel values of the block of pixels in the current frame with the pixel values of the corresponding block of pixels in the immediately previous frame, wherein the values include a magnitude and a sign;
   from the identified differences in the values, creating a corresponding block of signs associated with the differences in the values identified between the pixel values of the block of pixels within the current frame and the values of the corresponding block of pixels in the immediately previous frame;
   determining a randomness of a distribution of the signs in the corresponding block of signs associated with the differences in the values identified between the pixel values of the block of pixels within the current frame and the pixel values of the corresponding block of pixels in the immediately previous frame;
   based on the randomness of the distribution of the signs in the corresponding block of signs, classifying the block of pixels within the current frame as one of a background and non-moving foreground block of pixels if the randomness meets a predefined criterion;
   if the block of pixels within the current frame is one of a background and non-moving foreground block, performing recursive temporal filtering on the block of pixels within the current frame, otherwise not filtering the block of pixels within the current frame;

performing the comparing pixel values of the block of pixels in the current frame with pixel values of the corresponding block of pixels in the immediately previous frame, identifying differences in the values between the pixel values of the block of pixels in the current frame with the pixel values of the corresponding block of pixels in the immediately previous frame, creating a corresponding blocks of signs associated with the differences in the values identified between the pixel values of each of the block of pixels within the current frame and the values of each of the corresponding block of pixels in the immediately previous frame, determining the randomness of a distribution of the signs in each of the corresponding block of signs, classifying each of the block of pixels within the current frame based on the randomness of the distribution of the signs in the corresponding block of signs and filtering on each block of pixels within the current frame when classified as one of a background and non-moving foreground block for all blocks in the current frame; and encoding the classified and partially filtered frame for subsequent transmission to a video rendering application.

2. The method of claim 1, further comprising:
performing the determining signs of pixel value differences, determining the randomness, classifying and filtering when classified as one of a background and non-moving foreground block for a second set of blocks in the same frame, wherein the second set of blocks are offset and overlap partially with the classified and filtered blocks.

3. The method of claim 2, wherein a size and overlap of the second set of blocks are determined based on at least one from a set of a desired resolution, an available memory, an available bandwidth, and an available processing capacity.

4. The method of claim 1, wherein the randomness is determined based on a count of repetition of signs within at least one row and at least one column of each block of pixels, and wherein a size of each block is determined based on at least one from a set of: a desired resolution, an available memory, an available bandwidth, and an available processing capacity.

5. The method of claim 1, wherein the randomness is determined based on comparing the distribution of signs within each block to a template of ideal noise block and the predefined criterion is a preset deviation of each block from the template of ideal noise block.

6. The method of claim 1, wherein the randomness is determined based on counting a repetition of signs within each row and each column of each block, assigning a score to each row and each column based on a cost function, and analyzing an aggregated score for each block.

7. The method of claim 6, wherein each cost function is assigned a weight based on the counts.

8. The method of claim 6, wherein the cost function for each row and each column of a particular block of pixels are added to determine the randomness for the particular block of pixels.

9. The method of claim 6, wherein the aggregated score is computed employing a score function that is reset upon detection of a discontinuity in the signs of pixel value differences for the block of pixels.

10. The method of claim 1, wherein performing recursive temporal filtering on the block comprises:

setting a reference frame based on the current frame;
averaging each set of corresponding pixel values of blocks of pixels that have been classified as one of background and non-moving foreground in the two sequential frames in a weighted manner;
writing the average pixel values of the blocks classified as one of background and non-moving foreground in the two sequential frames to a new frame; and
setting the new frame as a new reference frame for subsequent averaging with a new received frame such that noise in a rendered frame is gradually reduced.

11. The method of claim 10, wherein the weighting is done based on predefined weighting the values for the two sequential frames, and wherein averaging is stopped and content replenished with content of corresponding input frame for blocks classified as moving foreground.

12. A computing device for temporal filtering of video signals employing sign-based pixel difference classification, comprising:
a memory
a video capture device configured to capture frames of video;
a processor coupled to the memory and the video capture device, and configured to execute a video processing application, the video processing application comprising:
a pre-processing module for:
receiving two sequential video frames comprising a current frame and an immediately previous frame;
a temporal filtering module for:
comparing pixel values of a block of pixels in the current frame with pixel values of a corresponding block of pixels in the immediately previous frame;
from the comparison, identifying differences in values between the pixel values of the block of pixels in the current frame with pixel values of the corresponding block of pixels in the immediately previous frame, wherein the values include a magnitude and a sign;
from the identified differences in the values, creating a corresponding block of signs associated with the differences in the values identified between the pixel values of the block of pixels within the current frame and the pixel values of the corresponding block of pixels in the immediately previous frame;
determining a randomness of a distribution of the signs in the corresponding block of signs associated with the differences in the values identified between the pixel values of the block of pixels within the current frame and the pixel values of the corresponding block of pixels in the immediately previous frame;
based on the randomness of the distribution of the signs in the corresponding block of signs, classifying the block of pixels within the current frame as one of a background and non-moving foreground block of pixels if the randomness meets a predefined criterion that is adjusted based on at least one from a set of an available transmission bandwidth, an available memory, an available processing capacity, a desired video resolution, and a user selection;
if the block of pixels within the current frame is a background block, performing one of recursive and non-recursive temporal filtering on the block of pixels within the current frame, otherwise not filtering the block of pixels within the current frame; and performing the comparing pixel values of the block of pixels in the current frame with pixel values of the corresponding block of pixels in the immediately previous frame, identifying differences in the values between the pixel values of the block of pixels in the current frame with pixel values of the corresponding block of pixels in the immediately previous frame, creating a corresponding blocks of signs associated with the differences in the values identified between the pixel values of each of the block of pixels within the current frame and the pixel values of each corresponding block of pixels in the immediately previous frame, determining the randomness of a distribution of the signs in each of the corresponding block of signs, classifying each of the block of pixels within the current frame based on the randomness of the distribution of the signs in the corresponding block of signs and filtering on each of the block of pixels within the current frame when classified as one of a background and non-moving foreground block for all blocks within the current frame;

an encoding module for:
encoding the classified and partially filtered frame for subsequent transmission to a video rendering application; and a communication device configured to transmit encoded frames to another computing device over a network for one of rendering and storage.

13. The computing device of claim 12, wherein the temporal filtering module is integrated into one of: the pre-processing module and the encoding module.

14. The computing device of claim 12, wherein the temporal filtering module is further configured to determine the randomness of the signs in the block of pixels based on one of counting a repetition of signs within each row and each column of the block of pixels, assigning a weighted cost function to each row and column of the block of pixels based on a count of repeated signs, and comparing the distribution of signs within the block of pixels to a template of ideal noise block.

15. The computing device of claim 12, wherein the video processing application is capable of processing video in at least one of RGB mode and YUV mode; and wherein the classification and filtering process is performed for each channel individually before the block of pixels is classified as a background block of pixels.

16. The computing device of claim 15, wherein determination of randomness of the signs is based on each color field, classification of the block of pixels as one of a background and non-moving foreground is based on combined results for each independent color channel, and filtering is applied consistently to all color channels such that the classification of the block of pixels is consistent for all color channels of the same block of pixels.

17. A tangible computer-readable storage medium with instructions stored thereon for temporal filtering of video signals employing sign-based pixel difference classification, the instructions comprising:

receiving two sequential video frames comprising a current frame and an immediately previous frame;
comparing pixel values of a block of pixels in the current frame with pixel values of a corresponding block of pixels in the immediately previous frame;
from the comparison, identifying differences in values between the pixels values of the block of pixels in the current frame with the pixel values of the corresponding block of pixels in the immediately previous frame, wherein the values include a magnitude and a sign;
from the identified differences in the values, creating a corresponding block of signs associated with the differences in the values identified between the pixel values of the block of pixels within the current frame and the pixel values of the corresponding block of pixels in the immediately previous frame;
determining a randomness of a distribution of the signs in the corresponding block of signs associated with the differences in the values identified between the pixel values of the block of pixels within the current frame and the pixel values of the corresponding block of pixels in the immediately previous frame;
based on the randomness of the distribution of the signs in the corresponding block of signs, classifying the block of pixels within the current frame as one of a background and non-moving foreground block of pixels if the randomness meets a predefined criterion;
if the block of pixels within the current frame is one of a background and non-moving foreground block, performing recursive temporal filtering on the block of pixels within the current frame;
if the block is a moving foreground block, processing the block of pixels within the current frame without temporal filtering;
performing the comparing pixel values of the block of pixels in the current frame with pixel values of the corresponding block of pixels in the immediately previous frame, identifying differences in the values between the pixel values of the block of pixels in the current frame with the pixel values of the corresponding block of pixels in the immediately previous frame, creating a corresponding blocks of signs associated with the differences in the values identified between the pixel values of each of the block of pixels within the current frame and the pixel values of each corresponding block of pixels in the immediately previous frame, determining the randomness of a distribution of the signs in each of the corresponding block of signs, classifying each of the block of pixels within the current frame based on the randomness of the distribution of the signs in the corresponding block of signs and filtering on each of the block of pixels within the current frame when classified as one of a background and non-moving foreground block for all blocks in the current frame;
encoding the classified and partially filtered frame; and
transmitting encoded frames to another computing device over a network for one of rendering and storage.

18. The tangible computer-readable storage medium of claim 17, wherein the classification is tracked at a pixel level.

19. The tangible computer-readable storage medium of claim 17, wherein the first set of blocks and the second set of blocks overlap by one of: ¼ block area and ½ block area.

20. The tangible computer-readable storage medium of claim 17, wherein performing recursive temporal filtering on the block of pixels comprises:
computing a weighted average value for each pixel of corresponding blocks of pixels classified as one of background and non-moving foreground in the two sequential video frames;
writing the weighted average value or each pixel to a new frame;
encoding the new frame for transmission; and
setting the new frame as reference frame for another weighted average computation with a next video frame.

* * * * *